2,811,104

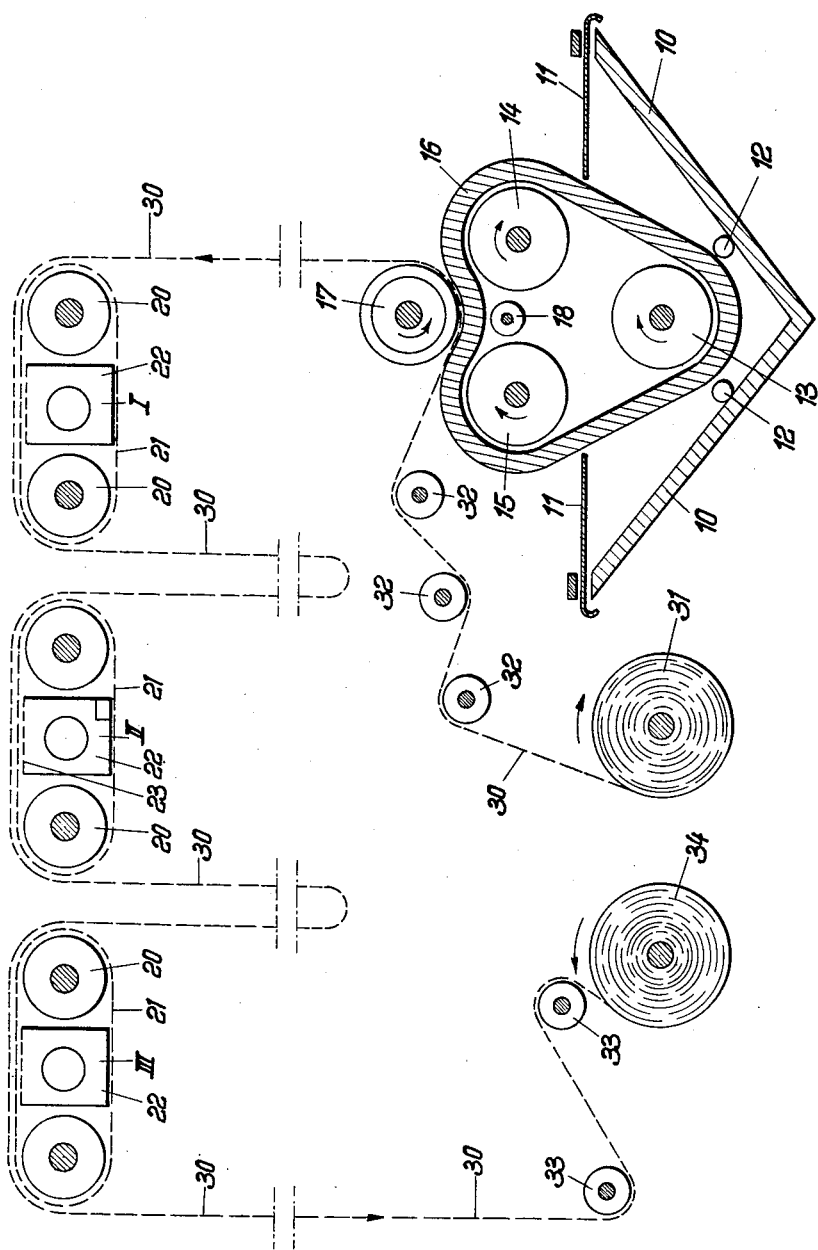

DEVICE FOR THE PRINT-LIKE TRANSFER OF COLOURS AND PATTERNS TO CARRIER MATERIALS

Herbert Keffel, Berlin-Charlottenburg, Germany

Application September 4, 1953, Serial No. 378,534

Claims priority, application Germany September 6, 1952

9 Claims. (Cl. 101—131)

This invention relates to a method for the direct transfer of synthetic materials to any carrier materials such as is the subject of the U. S. patent application Serial No. 362,975, filed on June 19, 1953. At the same time this invention incorporates devices which are especially suitable for carrying out such printing methods.

In the printing method with the hitherto known printing machines in general for each print the permanent printing form was supplied with printing ink, and the latter then transferred to a carrier material. This procedure was continuously repeated whereby, also in the case of offset printing, only the lettering or the like, previously transferred to a rubber cloth, is reproduced. Other multiplying methods, known as reproduction processes, where the printing form likewise becomes worn out, are unsuitable for the production of prints on running breadths or the like. They are also too inaccurate for printing in several colours.

In accordance with this invention, colours, any particular pattern, and other printing matter are transferred to any desired carrier materials, in that printing forms, consisting of plastical firm synthetic materials are produced as an endless band and, by the application of a solvent, are transferred in layers to a carrier material, in that the latter is led past a printing form preferably running over guide and driving rollers. The surface of the printing form, for this purpose, preferably at increased temperature is soaked in layers by means of the vapours of solvents or by means of sprinkling. Each and every dissolved or soaked layer is then transferred to the carrier material. Hereby the latter preferably is passed under a pressure roller against the rotating endless printing form, whereupon the printed band is fed to hangers consisting of series-connected drying units and conveyor belts, which pass the printed breadths direct to a winding device.

The astounding fact was revealed that a printing form, made as an endless synthetic-material band of somewhat ample size, may be transferred at great speed to any particular carrier material, while simultaneously becoming used up. A device for carrying out this method preferably consists of at least three pilot, guide and driving rollers of suitable design, arranged, within or above a solvent container capable of being heated and cooled, and provided if necessary with a sprinkling device for the solvent. The pilot and guide rollers for the endless rotating printing form are arranged in triangular shape, whereby one roller is best located inside the solvent container, which can be locked, while the two rollers arranged above rotate at about the same level outside the said container.

The carrier material to be printed is brought into contact with the printing form passing over the two rollers outside of the solvent container, whereby the material should preferably pass under a pressure roller between the pilot and guide rollers for the printing form at about the same level. Provision for a counter-pressure roller can also be made. At least two of the pilot and guide rollers, and preferably also the pressure and counter-rollers are designed adjustable. They can also be spring-supported.

For utilizing high printing speeds the printing rollers, as well as the feed and guide rollers for the carrier material are preferably arranged in such a way that the printed breadth is passed on directly to one or more hangers acting likewise as conveyor and drying devices. The dried breadth may then be wound up without any delay.

An example of an arrangement for carrying out the method of this invention is schematically shown in the accompanying drawing. A solvent container 10 which can be closed by slides 11 is best constructed as a two-wall unit, the hollow space contains heating and cooling means, although these may conventionally be provided inside the container. Furthermore the container 10 may be provided with a sprinkler device denoted by 12. The fittings for feeding and leading off the solvent are not shown. Not shown devices for swivelling or height-adjustment of the container 10 when same is preferably designed locally movable for an immediate interruption of work may likewise be provided.

Within, or as the case may be, above the container 10, provision is made for the actual printing machine. This consists of rollers 13, 14 and 15 serving as driving, pilot and guide rollers for the printing form 16 which, designed as an endless synthetic-material band, is placed round the said rollers and driven by them.

Above the rollers 14, 15, equidistant from their centre of rotation, provision is made for a pressure rollers 17 which may also operate with a counter-roller 18. Between rollers 13 to 15 and 18 and the printing form 16, spaces are shown to illustrate the adjustability of the rollers which, when applying the method, naturally are in contact with the printing form 16.

Adjacent to the printing device provision is made for a required number of hanger units each of which consists of two feed rollers 20 for an endless conveyor belt 21, and a heating or ventilation device 22 over which the band 21 passes. The feed of heating or cooling means can be effected in the conventional manner. Provision can be made for a perforated plate 23 over which a latticed belt runs. Heating can be effected by steam, electricity or by other known means.

The entire device functions as follows:

The carrier material 30 to be printed is taken from the reel 31 and passed via pilot rollers 32 to the pressure roller 17. Passing under the latter, the breadth 30 is then pressed between rollers 14, 15 against the printing form 16.

The vaporous solvent continually dissolves a thin layer of the surface of printing form 16 inside container 10, or the solvent is sprinkled to such an extent that, for the indicated direction of rotation within the range of roller 15, a layer of the printing form 16 becomes dissolved. The transfer of this layer takes place in the course of the passage of breadth 30 between roller 17 and the printing form 16, whereby the speed of the rollers 13 to 15, 17 and 18 are correspondingly regulated. Similarly, the encompassed angle of the rollers can have a corresponding magnitude in order to adjust contact time and contact pressure which depend on the synthetic material to be worked, and the solvent to be used.

Thereafter the printed breadth 30 runs over conveyor belt 21 of the hanger unit I and, if necessary, it passes on to additional hanger units II or III, whereby, according to the prevailing working and local conditions, larger or smaller hangers can additionally be employed in accordance with the requirements of drying time and the like. The complete breadth 30 then passes over pilot rollers 33 to a winding reel 34.

Instead of a pressure roller 17 provision could also be made for a stationary spring-loaded squeezing device or the like. The rollers 13, 14, 15, are not only in height but also in distance from each other adjustable. In this case it can also be arranged that the roller or the squeezing device 17 operates against one of the rollers 14, 15. According to the prevailing local conditions the driving and control means are of known design.

The printing form 16 can be produced in several ways. For example polyamide condensate, polyvinyl or other suitable synthetic materials—to which corresponding dyestuffs are added—are moulded in a hollow cylinder whose diameter corresponds to the distance and the outer circumference of the three rollers 13, 14, 15. Such a hollow cylinder, e. g. approximately 100 mm. in size, is then, like an endless band of suitable width, placed round rollers 13, 14, 15 as a printing form 16. In this case cyclohexanol, trichlorethylene or the like may be used as a solvent in accordance with the requirement of the synthetic material, the invention is however not restricted to the said synthetic materials and solvents.

The printing form can also be extruded as a seamless tube or hose-shaped band, while it is also possible to produce an endless band by application of synthetic-material paste in layers, or to produce the latter in a moulding machine whose hollow space corresponds to the required dimension of the hollow cylinder. In this case the surface of the printing form which subsequently comes to rest against rollers 13, 14, 15, can be provided with a textile layer or a layer of metal webbing, in order to avoid an excessive expansion of the printing form at high printing speeds. The length of the endless band depends on the repeat to be printed subsequently. If the repeats are long, in place of three rollers, provision can be made for further pilot, guide and driving rollers.

The breadth 30 can, since it always passes over the guide rollers with the unprinted side, be transported, both safely and at high speeds. Devices according to the invention permit printing speeds of about 100 metres per minute and more.

The printing form 16 consists throughout of the synthetic material mass to be transferred to the breadth 30. As it is shown in the U. S. patent application Ser. No. 362,975 the printing form 16 may be provided with any particular patterns extending over its entire thickness whereby it may be printed right down to the bottom. It is also possible to secure the printing forms in corresponding contours on the endless rubber cloth, metal band or the like, and then to transfer corresponding patterns to the breadth 30. In this case, besides printing one-coloured breadth, simultaneous printing in any desired number of colours is possible. Different-coloured patterns can be printed in any required combination.

An additional advantage provided by the method and device of this invention is incorporated in the fact that the machine, apart from reproducing the printing form 16, can also be used as a painting machine, whereby, in place of printing form 16, an endless rubber cloth is passed over rollers 13 to 15, whilst the roller 17 is replaced by a paint distributing knife. In this case the drying hanger is so modified that the painted carrier material contacts the endless conveyer belts only with the non-painted surface.

If, for example, a breadth 30 is printed with a recurring pattern, then every displacement of pattern, which usually is evident as the result of a gradually decreasing diameter of roller-shaped printing forms is prevented, in that the reproduction is effected by a band-shaped printing form. Since the solvent can be applied in vaporous condition, or can be sprinkled on, the consumption of solvent is consequently very low.

The adjustability of the printing rollers and the adaptability of the printing form and solvents enable, furthermore, to print patterns also on rough surfaces. Consequently, all kinds of papers, textiles and synthetic carrier materials, of any particular surface structure, can likewise be satisfactorily printed. By using suitable solvents the simultaneous printing of two sides is also possible. By means of the solvent the synthetic material of the printing form is simultaneously fixed on the carrier material.

What I claim is:

1. A printing apparatus, comprising, in combination, supporting roller means; an endless belt-shaped printing member consisting essentially of a soluble synthetic printing material, movably supported by said roller means; a container for holding a solvent for said soluble synthetic printing material and into which a portion of said belt-shaped printing member projects while supported by said roller means, the remaining portion of said printing member supported by said roller means extending outwardly of said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same thus printing said sheet.

2. A printing apparatus, comprising, in combination, supporting roller means; an endless belt-shaped printing member consisting essentially of a soluble synthetic printing material, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

3. A printing apparatus, comprising, in combination, supporting roller means; and endless belt-shaped printing member consisting essentially of a soluble synthetic printing material having a predetermined colored pattern on the surface thereof, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

4. A printing apparatus, comprising, in combination, supporting roller means; an endless belt-shaped printing member consisting essentially of a soluble synthetic printing material having a predetermined colored pattern extending throughout the thickness thereof, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

5. A printing apparatus, comprising, in combination, supporting roller means; an endless belt-shaped printing member consisting essentially of a soluble synthetic printing material, movably supported by said roller means; a container into which a portion of said belt-shaped printing member projects while supported by said roller means, the remaining portion of said printing member supported by said roller means extending outwardly of said container; means for applying a solvent to the surface of said portion of said printing member in said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

6. A printing apparatus, comprising, in combination, supporting roller means; an endless belt-shaped printing member consisting essentially of a soluble synthetic printing material, movably supported by said roller means; a container into which a portion of said belt-shaped printing member projects while supported by said roller means, the remaining portion of said printing member supported by said roller means extending outwardly of said container; means for applying a solvent to the surface of said portion of said printing member in said container; means for controlling the temperature of a solvent in said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

7. A printing apparatus, comprising, in combination, supporting roller means; an endless belt-shaped printing member consisting essentially of a layer of soluble synthetic printing material arranged on an endless belt-shaped support, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

8. A printing apparatus, comprising, in combination, supporting roller means; an endless belt-shaped printing member consisting essentially of a layer of soluble synthetic printing material arranged on an endless belt-shaped support made of metal, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

9. A printing apparatus, comprising, in combination, supporting roller means; an endless belt-shaped printing member consisting essentially of a layer of soluble synthetic printing material arranged on an endless belt-shaped support made of textile material, movably supported by said roller means; a container into which a portion of said belt-shaped printing member projects while supported by said roller means, the remaining portion of said printing member supported by said roller means extending outwardly of said container; means for dissolving the surface of said portion of said printing member, said means being arranged within said container; and means for guiding a sheet to be printed along at least part of said remaining portion of said printing member and in contact with the surface thereof while moving said printing member about said supporting roller means, whereby a surface layer of said printing member may be dissolved while the same moves through said container and the thus dissolved surface layer of said printing member is adhered to the surface of said sheet to be printed while in contact with the same, thus printing said sheet.

References Cited in the file of this patent

UNITED STATES PATENTS

| Number | Name | Date |
|---|---|---|
| 627,329 | Dratz | June 20, 1899 |
| 1,808,476 | Pinder | June 2, 1931 |
| 1,834,147 | Dausmann | Dec. 1, 1931 |
| 1,989,375 | Meyercord | Jan. 29, 1935 |
| 1,998,028 | Sark | Apr. 16, 1935 |
| 1,999,549 | Tchechonin | Apr. 30, 1935 |
| 2,165,867 | Lohrey | July 11, 1939 |
| 2,217,065 | Magath | Oct. 8, 1940 |
| 2,272,406 | Gurwick | Feb. 10, 1942 |
| 2,631,532 | Harless | Mar. 17, 1953 |

FOREIGN PATENTS

| Number | Country | Date |
|---|---|---|
| 566,155 | Great Britain | Dec. 15, 1944 |